Aug. 28, 1956 J. KIRKPATRICK 2,760,251
TENTERING FRAME
Filed Sept. 20, 1955
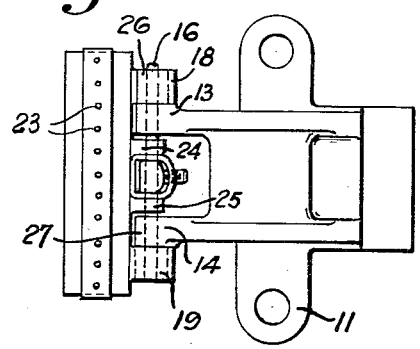
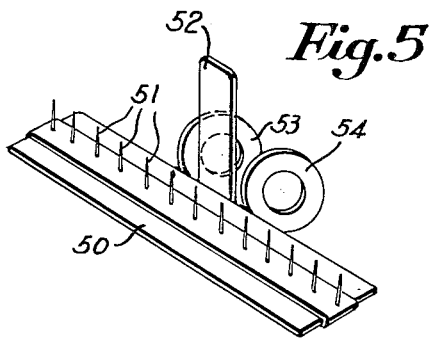
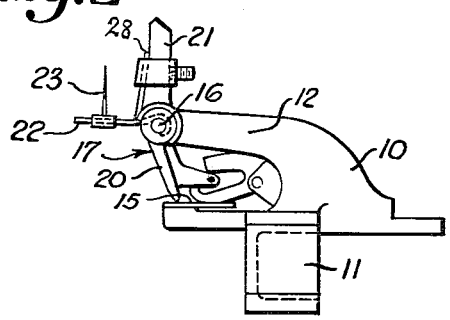
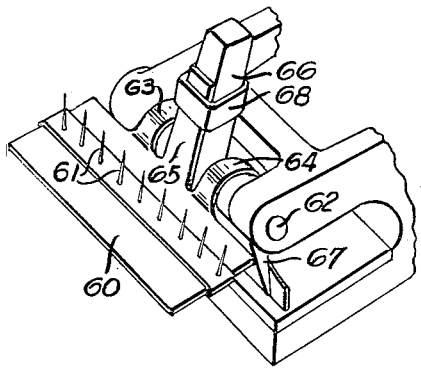
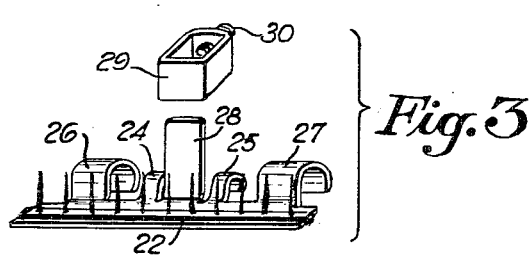
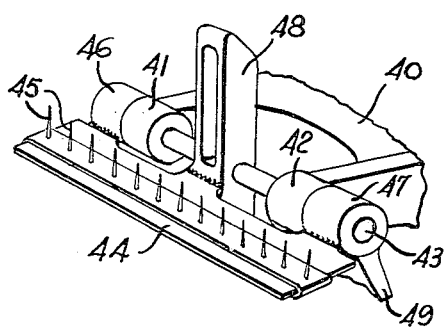
INVENTOR.
JOHN KIRKPATRICK
BY Richards Geier
ATTORNEYS

United States Patent Office 2,760,251
Patented Aug. 28, 1956

2,760,251

TENTERING FRAME

John Kirkpatrick, Mechanicsville, Conn.

Application September 20, 1955, Serial No. 535,471

5 Claims. (Cl. 26—62)

This invention relates to tentering frames used in connection with fabric finishing and refers more particularly to a device by means of which a gripping device may be conveniently converted into a pin device or vice versa.

Gripping devices now in use consist of a substantial number of gripping clips which hold the fabric to be finished and which open automatically through the use of cams and other clip actuating devices. Besides these clipping clips, pin clips are also used to a large extent which hold the fabric upon pins mounted on the clips. Certain operations may be carried out conveniently on gripping clips while others require the use of pin clips. Installations of which gripping clps and pin clps form a part are quite expensive and occupy a large amount of space. Thus the necessity of employing gripping clips as well as pin clips results in expensive installations and the loss of time involved in switching from one type of machinery to the other.

An object of the present invention is to eliminate the above described drawbacks and inconveniences through the provision of a conversion member of simple and inexpensive construction by means of which a gripping clip may be easily and quickly converted into a pin clip.

Another object is the provision of a combined gripping and pin clip which may be effectively employed as either a gripping clip or a pin clip.

Other objects of the present invention will become apparent in the course of the following specification.

The objects of the present invention may be realized through the provision of a grip converter comprising a pin-supporting plate and so constructed that it can be conveniently mounted upon the pivot pin of the gripping clip and attached to the clipping lever thereof. The pin-supporting plate extends substantially at right angles to the clipping lever and projects outwardly therefrom. Thus the pin-supporting plate operates in a most effective manner and can be easily removed when the clipping lever is to be used.

The invention will appear more clearly from the following detailed description when taken in connection with the accompanying drawing showing by way of example preferred embodiments of the inventive idea.

In the drawing:

Figure 1 is a plan view of the combined gripping and pin clip of the present invention.

Figure 2 is a side view of the clip shown in Figure 1.

Figure 3 is a perspective view of the clip converter shown in Figures 1 and 2.

Figure 4 is a perspective view of a differently constructed combined gripping and pin clip.

Figure 5 is a perspective view of a somewhat differently constructed clip converter.

Figure 6 is a perspective view of a combined gripping and pin converter of a somewhat different form.

Figures 1 and 2 of the drawings illustrate a clip comprising a bracket 10. The base of the bracket is firmly connected with supports 11 by means of which the bracket 10 may be attached to a sprocket chain (not shown). This chain moves the clips and provides a feed for the fabric.

The bracket 10 has an upper projecting portion 12 having two separate spaced bearing elements 13 and 14. The lower portion of the bracket 10 is provided with a clamping surface 15.

A pivot pin 16 is firmly mounted in the bearing members 13 and 14 and carries a clipping lever 17. In the example illustrated, the lever 17 has a central portion which is mounted upon the pivot pin 16 between the bearing elements 13 and 14; furthermore the lever 17 has two sleeve portions 18 and 19 which are also mounted upon the pivot pin 16 and are in engagement with the outer surfaces of the bearing elements 13 and 14, respectively. These sleeve-like elements are interconnected by a lower portion 20 which constitutes the clipping portion of the lever and which cooperates with the clamping surface 15.

The central portion of the lever 17 has the form of an upstanding arm 21 which extends above the bracket 10 and which forms with the lower portion 20 an angle of about 165 degrees.

This gripping clip may operate in the usual manner by holding the fabric to be finished tightly between the clipping portion 20 and the clamping surface 15.

In accordance with the present invention, the gripping clip is provided with a clip converter which is shown separately in Figure 3. This converter comprises a plate 22 carrying pins 23 and extending outwardly at approximately right angles to the clipping lever 17.

In the example illustrated, the plate 22 has two small curved supporting elements 24 and 25 and two larger curved supporting elements 26 and 27. As shown in Figure 1, the supporting elements 24 and 25 extend over the upper surface of the pivot pin 16 and are located on opposite sides of the upstanding arm 21. The larger supporting elements or brackets 26 and 27 extend over the bearings or sleeves 18 and 19 which form a part of the clipping lever 17.

The plate 22 also carries an upstanding arm 28 which may be firmly connected with the arm 21 of the clipping lever 17 by means of a ring 29 provided with a set screw 30. As shown in Figure 2, the arm 28 has a portion which extends in contact with the arm 21 and is firmly pressed against the arm 21 by the ring 29 carrying the screw 30.

The operation of the device is readily apparent from the above description. When the plate 22 is mounted upon the bracket 10 the device can be readily used as a pin clip. On the other hand, the device can be readily used as a gripping clip. It is thus apparent that the necessity of employing two separate machines having different clips is effectively eliminated.

Figure 4 illustrates a construction wherein a single element carries out the function of the gripping clip and the pin clip. This construction includes a bracket 40 having two sleeves 41 and 42 which carry the pivot pin 43. A plate 44 provided with pins 45 is integral with sleeves 46 and 47 which are mounted upon the pivot pin 43. The plate 44 is also integral with a single upstanding arm 48 which is also mounted upon the pivot pin 43. The device includes a clipping portion 49 which is integral with the plate 44, the sleeves 46 and 47 and the arm 48. It is apparent that this device will operate equally well either as a gripping clip or as a pin clip in the manner previously described.

Figure 5 illustrates a clip converter having a plate 50 carrying pins 51 and provided with an upstanding arm 52 which may be attached to the arm of the gripping clip in the manner shown in Figure 2. In this construction, the plate 50 is attached to the pivot pin by two rings 53 and 54 which are integral with the plate 50. In other respects the device is the same as the ones previously described and operates in the same manner.

In the construction shown in Figure 6, the plate 60 carrying pins 61 is mounted upon the pivot pin 62 solely by means of two curved brackets 63 and 64 integral with the plate 60. The arm 65 of the plate 60 is firmly connected with the upstanding arm 66 of the clip lever 67 by means of a ring 68 which fits tightly over the engaging portions of the arms 65 and 66.

It is apparent that the above examples have been given solely by way of illustration and not by way of limitation and that they are subject to many variations and modifications without departing from the scope of the present invention. All such variations and modifications are to be included within the scope of the present invention.

What is claimed is:

1. In a tentering frame, a combined gripping and pin clip, comprising a bracket having a clamping surface, a pivot pin carried by said bracket, a clipping lever rotatably mounted upon said pin and having a clipping portion cooperating with said clamping surface and an upstanding arm, a pin-supporting plate, means firmly connected with said plate for pivotally supporting said plate upon said pivot pin, and means firmly connecting said plate with said arm, whereby said plate is swingable along with said lever, said plate extending outwardly in relation to said lever.

2. In a tentering device, a clip member comprising a clipping lever, a pin-supporting plate extending at at least right angles to said clipping lever, means firmly connecting said lever with said plate, and means supporting said lever and said plate for common pivotal movement.

3. For use on a gripping clip having a pivot pin and a clipping lever rotatably mounted upon said pivot pin and having an upstanding arm; a clip converter comprising a pin-supporting plate, brackets carried by said plate for mounting said plate upon the pivot pin, and an arm engaging member firmly connected with said plate.

4. In a tentering frame, a combined gripping and pin clip, comprising a bracket having a clamping surface and two bearing elements, a pivot pin mounted in said bearing elements, a clipping lever rotatably mounted upon said pin intermediate said bearing elements and having a clipping portion cooperating with said clamping surface and an upstanding arm, a pin-supporting plate, brackets carried by said plate and mounted upon said pivot pin adjacent said bearing elements for pivotally supporting said plate upon said pivot pin, an upstanding tongue firmly connected with said plate and having a portion contacting said arm, a connecting ring mounted upon said arm and enclosing said tongue portion, and a set screw upon said ring.

5. For use on a gripping clip having a bracket having a clamping surface and two bearing elements, a pivot pin mounted in said bearing elements, a clipping lever rotatably mounted upon said pin intermediate said bearing elements and having a clipping portion cooperating with said clamping surface and an upstanding arm; a clip converter comprising a pin-supporting plate, brackets carried by said plate and for mounting said plate upon said pivot pin, said brackets fitting adjacent said bearing elements, and an upstanding tongue firmly connected with said plate and having an arm-engaging portion.

References Cited in the file of this patent

UNITED STATES PATENTS

| | | |
|---|---|---|
| 754,649 | Gessner | Mar. 15, 1904 |
| 2,584,553 | Ciciva | Feb. 5, 1952 |

FOREIGN PATENTS

| | | |
|---|---|---|
| 15,612 | Great Britain | of 1903 |
| 104,467 | Germany | Mar. 19, 1898 |
| 912,326 | Germany | May 28, 1955 |
| 1,004,530 | France | Nov. 28, 1951 |
| 1,039,126 | France | May 13, 1953 |